A. S. NEWMAN.
SHUTTER FOR PHOTOGRAPHIC CAMERAS.
APPLICATION FILED MAY 31, 1913.

1,095,020.

Patented Apr. 28, 1914.
2 SHEETS—SHEET 1.

Witnesses:
Bertha M. Allen.
Marie D. Wohlers.

Inventor:
Arthur Samuel Newman
By Serrell & Son
his Attys

A. S. NEWMAN.
SHUTTER FOR PHOTOGRAPHIC CAMERAS.
APPLICATION FILED MAY 31, 1913.

1,095,020.

Patented Apr. 28, 1914.

2 SHEETS—SHEET 2.

Witnesses:
Bertha M. Allen.
Marie D. Wohler.

Inventor:
Arthur Samuel Newman.
By Serrell
his attys

UNITED STATES PATENT OFFICE.

ARTHUR S. NEWMAN, OF HIGHGATE, LONDON, ENGLAND.

SHUTTER FOR PHOTOGRAPHIC CAMERAS.

1,095,020.  Specification of Letters Patent.  Patented Apr. 28, 1914.

Application filed May 31, 1913. Serial No. 770,868.

*To all whom it may concern:*

Be it known that I, ARTHUR SAMUEL NEWMAN, a subject of the King of Great Britain, residing at Highgate, in the county of London, England, have invented certain new and useful Improvements in Shutters for Photographic Cameras, of which the following is a specification.

The invention relates to shutters for photographic cameras, and has for its object to construct a shutter which will always give the same exposure when the arm or lever regulating the length of exposure is in the same position, and which is very simple in construction.

The invention relates to that type of shutter in which a number of blades are pivoted around the aperture to be covered and uncovered and are caused to move toward and away from the center of the aperture by means of an oscillating plate provided with slots in each of which works a pin carried by one of the blades.

It is usual to operate the plate by means of a coiled spring which causes a pivoted disk or the like to be partly rotated, said disk having a crank pin to move the plate by suitable intermediate mechanism. It is also usual to employ an air cylinder and piston to regulate the length of exposure.

The invention therefore consists broadly in the combination and arrangement of parts producing a shutter which gives very accurate results.

The invention is illustrated in the accompanying drawings, in which:—

Figure 1:
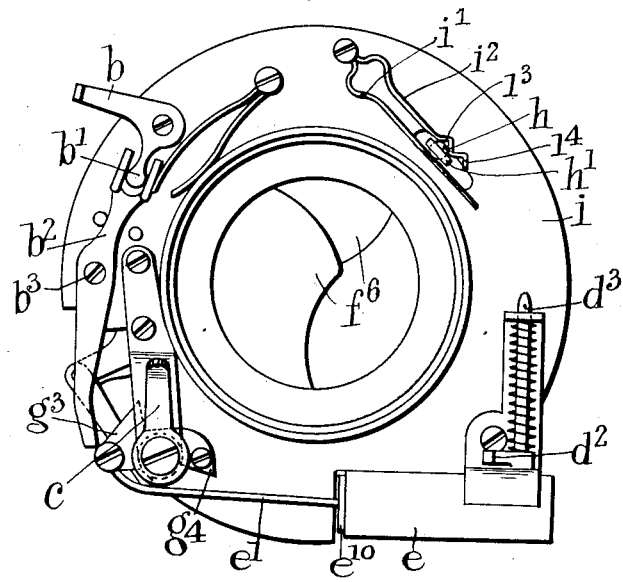
Figure 2:
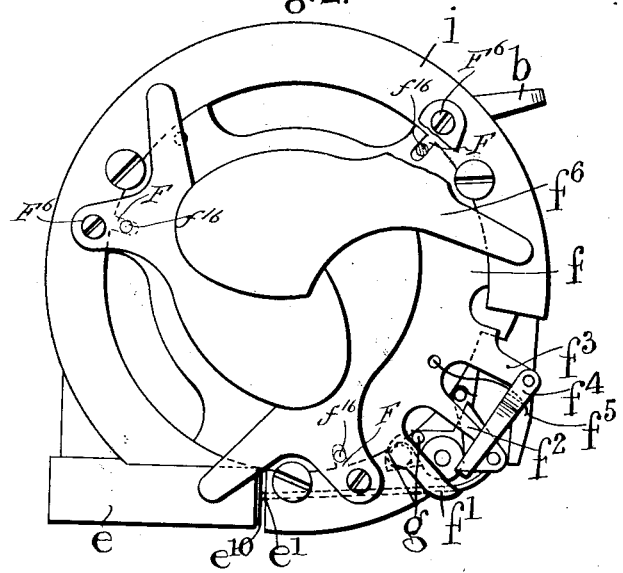
Figure 3:
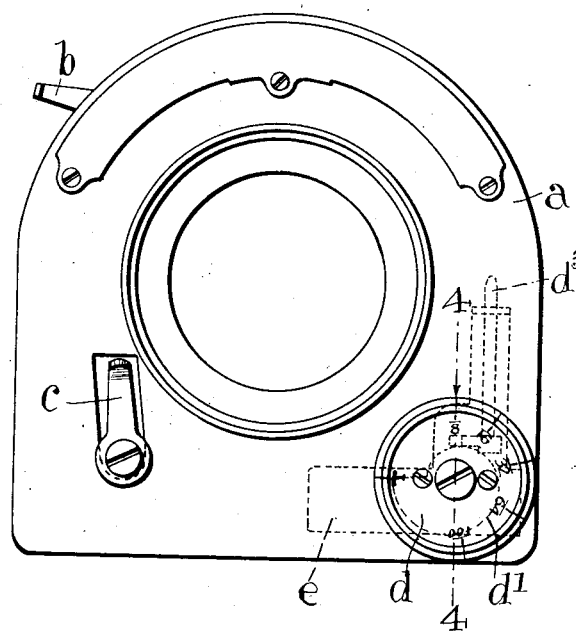
Figure 4:
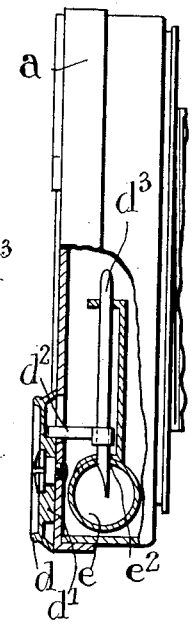
Figure 5:
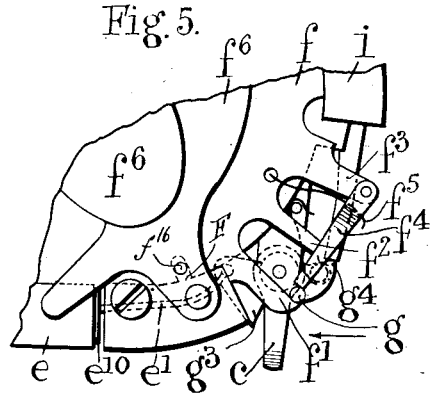
Figure 6:
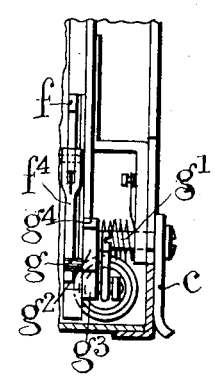

Figures 1 and 2 are respectively front and rear elevations of the shutter proper and operating mechanism removed from the outer casing, which latter merely carries means for moving the mechanism which regulates the passage of air into the usual air cylinder. In Figs. 1 and 2, the parts are shown after an exposure has been made. Fig. 3 is a front elevation of the complete shutter in its casing, and Fig. 4 is a side elevation of the same shown partly in section on the line 4—4 of Fig. 3. Fig. 5 shows part of the mechanism seen in Fig. 2, with the parts as they appear when the shutter is wound up ready for exposure. Fig. 6 is a side elevation of the parts shown in Fig. 5.

The shutter mechanism is inclosed in a casing $a$ having suitable apertures through which project the releasing lever $b$ and the winding lever $c$. The casing $a$ carries the oscillating disk $d$ which is suitably graduated around its exterior to indicate the exposure which will be given by the shutter when the disk $d$ is in various positions. In the drawings the disk $d$ is shown made integral with a snail cam $d'$ which raises an arm $d^2$ fixed to the spring-controlled rod $d^3$, the lower end of which is beveled or tapered. As the disk $d$ and snail $d'$ are oscillated, the rod $d^3$ is raised or lowered, thus regulating the air passage into the cylinder $e$ and consequently the exposure. Other methods may be employed for raising the rod $d^3$ or regulating the admission of air. Within the casing $a$ is fixed the supporting plate $i$ to which are pivoted the releasing levers $b$ $b^2$ and the disk $g^2$. The supporting plate $i$ also carries the air cylinder $e$ and the supports for the rod $d^3$.

According to the present invention, the oscillating plate $f$ which is located in the recess in the plate $i$ has a projecting portion which is roughly divided into three radial arms $f'$, $f^2$, $f^3$. One arm, $f'$, is acted upon by the oscillating crank pin $g$ by which the oscillating plate $f$ is moved in one direction. The central arm, $f^2$, acts as a stop, and the other arm, $f^3$ has pivoted thereto an arm $f^4$ which is under the influence of a spring $f^5$ and is normally resting on the central arm $f^2$ acting as a stop. Any other means may be employed for stopping the pivoted arm $f^4$ in a position tangential to the path of movement of the crank pin $g$. To the fixed supporting plate $i$ are pivoted the shutter blades $f^6$ by the screws $F^6$. The oscillating plate $f$ has radial slots $F$ therein, in which are located pins $f^{16}$ carried by the shutter blades $f^6$.

When the crank pin $g$ is rotated in the act of winding up the spring $g'$, it raises the pivoted arm $f^4$ off its stop $f^2$ and rests between the end of pivoted arm $f^4$ and the side of arm $f'$, as seen in Fig. 5. When the crank pin $g$ is released by any suitable mechanism, it first presses against the end of the pivoted arm $f^4$ and moves the oscillating plate $f$ in one direction to open the shutter blades $f^6$. The crank pin then passes off the end of the pivoted arm $f^4$ and moves between the central arm $f^2$ and arm $f'$ without moving the oscillating plate $f$. Finally the crank-pin $g$ comes into contact with arm $f'$ and moves the plate $f$ in the opposite direction to close the shutter.

The shutter releasing mechanism, which is shown in the drawings consists of the lever $b$ which is a bell crank lever, the arm $b'$ of which is located between the forked end of the lever $b^2$ and pivoted at $b^3$. The lower end of the lever $b^2$ moves into and out of the path of two ratchet teeth $g^3$, $g^4$ formed on or fixed to the disk $g^2$ carrying the crank pin $g$. The ratchet tooth $g^3$ arrests the crank pin disk when it has opened the shutter, as is hereinafter explained. The ratchet tooth $g^4$ arrests the crank pin disk $g^2$ when the spring $g'$ is fully wound up, that is to say, when the crank pin disk has been turned somewhat more than half a revolution. For rapid exposures, the lever $b$ is pressed and the shutter opens and closes before the lever $b$ is released. Consequently, the lower end of the lever $b^2$ does not arrest the tooth $g^3$ on the disk $g^2$.

Now, if it is desired to set the shutter for focusing, the time regulating lever is set to retard the speed of the shutter, the lever $b$ is pressed and it is released as soon as the lever $b^2$ has freed the pivoted part or disk $g^2$ carrying the crank pin $g$. The crank pin $g$, as above explained, acts against the end of the pivoted arm $f^4$ and opens the blades $f^6$, but the crank pin disk $g^2$ is arrested by the ratchet tooth $g^3$ thereon coming into contact with the lower end of the lever $b^2$ about halfway through its oscillation. The shutter thus remains open. When it is desired to close the shutter the spring $g'$ is again wound up by means of the lever $c$ and the crank pin $g$ acts against arm $f'$, but against the outer end of it, to close the shutter. When it is desired to set the shutter for a long exposure it is wound up and the lever $b$ is pressed and released as above described so that the lower end of the lever $b^2$ may arrest the ratchet tooth $g^3$. The releasing lever $b$ is again pressed to operate the lever $b^2$ to release the ratchet tooth $g^3$ when it is desired to close the shutter.

The oscillating plate $f$ carries at one part a steel or like ball $h$ by means of a short tube or loop $h'$, the ball being of such a diameter that it is gripped by springs on each side of the tube or loop $h'$. This short tube or loop $h'$ passes up through a slot in the fixed supporting plate $i$ so that the ball $h$ is held above the fixed plate $i$. To this fixed plate $i$ is pin-jointed a pair of springs $i'$, $i^2$, which act on diametrically opposite points of the ball $h$, and one of said springs, $i^2$, has two deep indentations $i^3$, $i^4$, to receive the ball $h$ at each end of the travel of the reciprocating plate $f$. The spring $i^2$ preferably does not touch the loop $h'$. Thus, when the shutter has been moved into its open or closed position, the plate $f$ cannot move accidentally. The arresting power of the spring $i^2$ does not, however, prevent the spring $g'$ oscillating the plate $f$.

The crank pin disk $g^2$ is connected by the rod $e'$ to a piston $e^{10}$ working in a cylinder $e$ having a hole $e^2$ at its inner end, the effective passage therethrough being regulated by the mechanism above described or in any usual manner. When the spring $g'$ is wound up, the piston $e^{10}$ is in its innermost position and acts merely by suction to retard the action of the driving spring. Any other suitable mechanism than that above described may be employed to release the two ratchet teeth $g^3$, $g^4$, of the crank pin disk $g^2$.

What I claim is:—

1. In a shutter for photographic cameras, the combination of a supporting plate, a spring-operated part pivoted to said plate, a crank pin on said spring-operated pivoted part, a plurality of shutter blades pivoted to the supporting plate, an oscillating plate carried by the supporting plate for operating said shutter blades, a spring arm pivoted on said oscillating plate by which the oscillating plate is moved by the crank pin in one direction, a fixed part on said oscillating plate by which it is moved by the crank pin in the opposite direction, means for retaining the spring-operated pivoted part when it is wound up, means for releasing said spring-operated part, a rod one end of which is connected to the spring-operated pivoted part, a piston to which the other end of the rod is connected, a cylinder carried by the supporting plate in which the piston merely acts by suction, and means for regulating the admission of air to the inner end of the cylinder, substantially as set forth.

2. In a shutter for photographic cameras, the combination of a supporting plate, a spring-operated part pivoted to said plate, a crank pin on said spring-operated part, a plurality of pivoted shutter blades pivoted to the supporting plate, an oscillating plate for operating said shutter blades, one fixed arm on said oscillating plate having a spring arm pivoted thereto by which the oscillating plate is driven by the crank pin in one direction, a second fixed arm on said oscillating plate acting as a stop for the spring arm and a third fixed arm on said oscillating plate by which it is moved by the crank pin in the opposite direction, means for retaining the spring-operated part when it is wound up, means for releasing said spring-operated part, a rod one end of which is connected to the spring-operated pivoted part, a piston to which the other end of the rod is pivoted, a cylinder fixed to the supporting plate in which the piston merely acts by suction, and means for regulating the admission of air to the inner end of the cylinder, substantially as set forth.

3. In a shutter for photographic cameras, the combination of a supporting plate, a spring-operated part pivoted to said plate, a crank pin on said spring-operated pivoted part, a plurality of shutter blades pivoted to the said plate, an oscillating plate for operating said shutter blades, a spring arm pivoted on said oscillating plate by which the oscillating plate is moved by the crank pin in one direction, a fixed part on said oscillating plate by which it is moved by the crank pin in the opposite direction, a tube on said oscillating plate, a ball located in said tube and extending beyond the open ends thereof, a slot in the supporting plate in which the tube moves, two springs pivoted to the said supporting plate, one of said springs having two indentations to receive the ball without touching the tube, means for retaining the spring-operated pivoted part when it is wound up, means for releasing said spring-operated part, a rod one end of which is connected to the spring-operated pivoted part, a piston to which the other end of the rod is connected, a cylinder fixed to said supporting plate in which the piston merely acts by suction, and means for regulating the admission of air to the inner end of the cylinder, substantially as set forth.

In witness whereof I have hereunto set my hand in presence of two witnesses.

ARTHUR S. NEWMAN.

Witnesses:
 WM. GIRLING,
 W. E. ROGERS.

---

Copies of this patent may be obtained for five cents each, by addressing the "Commissioner of Patents, Washington, D. C."